US012596943B2

(12) United States Patent
Hermle et al.

(10) Patent No.: US 12,596,943 B2
(45) Date of Patent: Apr. 7, 2026

(54) MACHINE-LEARNED MODEL INCLUDING INCREMENTALITY ESTIMATION

(71) Applicant: Microsoft Technology Licensing, LLC, Redmond, WA (US)

(72) Inventors: Johannes Hermle, San Francisco, CA (US); Giorgio Paolo Martini, Redwood City, CA (US); Shan Zhou, Cupertino, CA (US); Tilbe Caglayan, Menlo Park, CA (US); Qianqi Shen, Saratoga, CA (US); Wen Pu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1036 days.

(21) Appl. No.: 17/543,210

(22) Filed: Dec. 6, 2021

(65) Prior Publication Data

US 2023/0177366 A1 Jun. 8, 2023

(51) Int. Cl.
    *G06Q 30/02* (2023.01)
    *G06N 7/00* (2023.01)

(52) U.S. Cl.
    CPC ..................................... *G06N 7/00* (2013.01)

(58) Field of Classification Search
    CPC ...... G06N 7/00; G06N 20/00; G06Q 30/0202; G06Q 30/0249; G06Q 30/0273; G06Q 50/01
    See application file for complete search history.

(56) References Cited

U.S. PATENT DOCUMENTS

| | | | | |
|---|---|---|---|---|
| 11,410,203 B1 * | 8/2022 | Haque | ................ | G06Q 30/0275 |
| 2007/0239575 A1 * | 10/2007 | Claridge | ................ | G06Q 30/00 |
| | | | | 705/40 |
| 2008/0133497 A1 * | 6/2008 | Kehl | ..................... | G06F 16/337 |
| | | | | 707/999.005 |
| 2015/0100423 A1 * | 4/2015 | Oldham | ............. | G06Q 30/0256 |
| | | | | 705/14.54 |
| 2015/0332310 A1 * | 11/2015 | Cui | ..................... | G06Q 30/0275 |
| | | | | 705/14.45 |

(Continued)

OTHER PUBLICATIONS

"Everything Marketers Need to Know About Incrementality Testing" (Screenshot captured on Sep. 18, 2021 retrieved using Internet Archive Wayback Machine on Mar. 7, 2025; published online at https://www.appsflyer.com/blog/tips-strategy/incrementality-testing-for-marketers/) (Year: 2021).*

*Primary Examiner* — James M Detweiler
(74) *Attorney, Agent, or Firm* — KDW Firm PLLC

(57) ABSTRACT

In an example embodiment, a machine-learned model is trained to forecast a performance-based metric for a piece of content based on a budget applied to the piece of content. The increase in the performance-based metric that is due to a corresponding increase in budget may be termed "incrementality." The machine-learned model is trained in such a way that incrementality is built into the model. More particularly, in an example embodiment, an asymmetric budget split process is used to create two groups of training data, one for high budget and one for low budget. Rather than relying on historical data, the asymmetric budget split process applies a high budget to a piece of content in a first subgroup (e.g., group of users) and a low budget to that same piece of content in a second subgroup, and then the performance results in each subgroup are compared.

16 Claims, 10 Drawing Sheets

(56)               References Cited

U.S. PATENT DOCUMENTS

| | | | |
|---|---|---|---|
| 2016/0189201 A1* | 6/2016 | Shao | G06Q 30/0243 |
| | | | 705/14.42 |
| 2019/0311399 A1* | 10/2019 | Liu | G06Q 30/0247 |
| 2021/0035163 A1* | 2/2021 | Peris | G06Q 30/0243 |

* cited by examiner

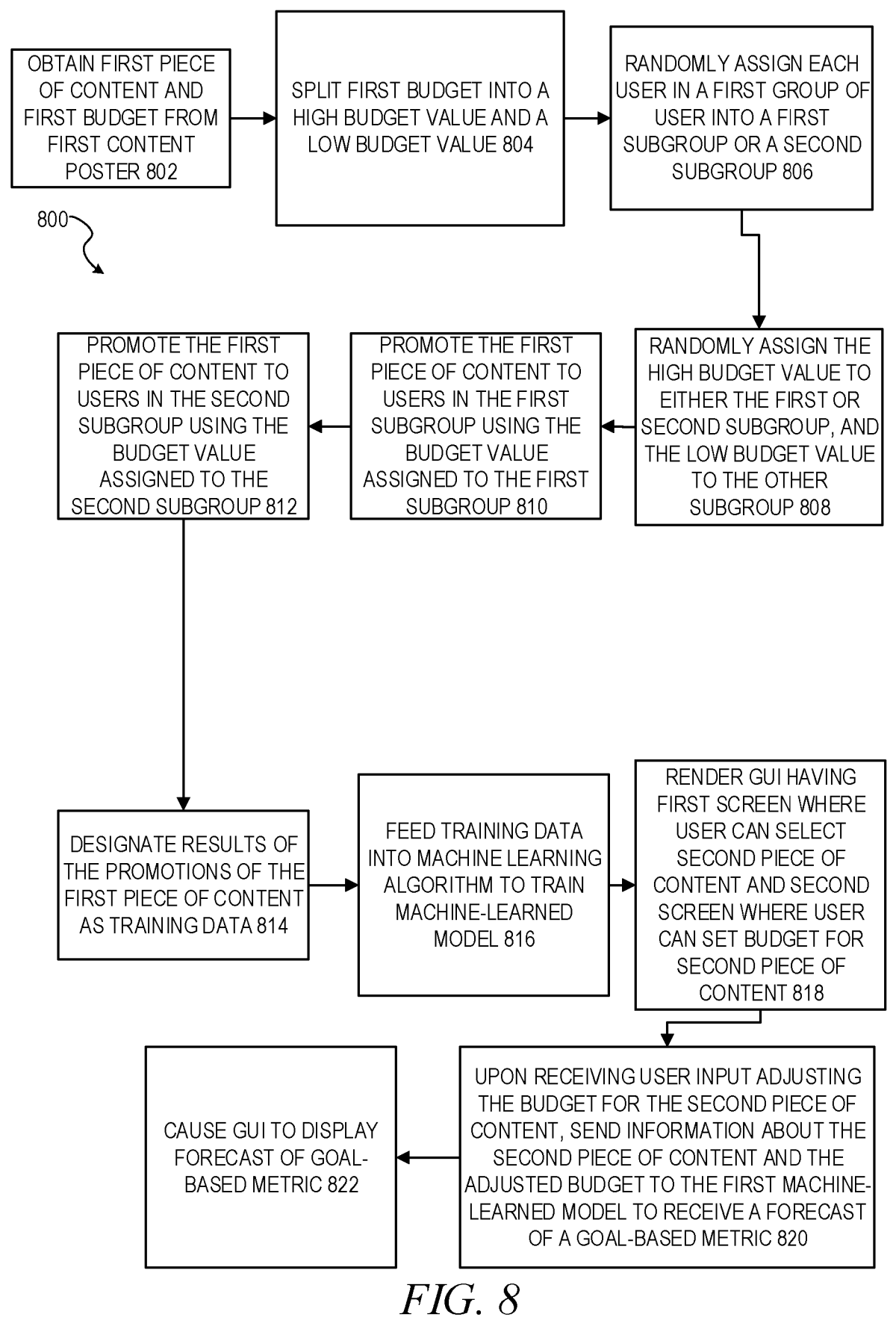

OBTAIN FIRST PIECE OF CONTENT AND FIRST BUDGET FROM FIRST CONTENT POSTER 802

SPLIT FIRST BUDGET INTO A HIGH BUDGET VALUE AND A LOW BUDGET VALUE 804

RANDOMLY ASSIGN EACH USER IN A FIRST GROUP OF USER INTO A FIRST SUBGROUP OR A SECOND SUBGROUP 806

800

PROMOTE THE FIRST PIECE OF CONTENT TO USERS IN THE SECOND SUBGROUP USING THE BUDGET VALUE ASSIGNED TO THE SECOND SUBGROUP 812

PROMOTE THE FIRST PIECE OF CONTENT TO USERS IN THE FIRST SUBGROUP USING THE BUDGET VALUE ASSIGNED TO THE FIRST SUBGROUP 810

RANDOMLY ASSIGN THE HIGH BUDGET VALUE TO EITHER THE FIRST OR SECOND SUBGROUP, AND THE LOW BUDGET VALUE TO THE OTHER SUBGROUP 808

DESIGNATE RESULTS OF THE PROMOTIONS OF THE FIRST PIECE OF CONTENT AS TRAINING DATA 814

FEED TRAINING DATA INTO MACHINE LEARNING ALGORITHM TO TRAIN MACHINE-LEARNED MODEL 816

RENDER GUI HAVING FIRST SCREEN WHERE USER CAN SELECT SECOND PIECE OF CONTENT AND SECOND SCREEN WHERE USER CAN SET BUDGET FOR SECOND PIECE OF CONTENT 818

CAUSE GUI TO DISPLAY FORECAST OF GOAL-BASED METRIC 822

UPON RECEIVING USER INPUT ADJUSTING THE BUDGET FOR THE SECOND PIECE OF CONTENT, SEND INFORMATION ABOUT THE SECOND PIECE OF CONTENT AND THE ADJUSTED BUDGET TO THE FIRST MACHINE-LEARNED MODEL TO RECEIVE A FORECAST OF A GOAL-BASED METRIC 820

*FIG. 8*

MACHINE-LEARNED MODEL INCLUDING INCREMENTALITY ESTIMATION

TECHNICAL FIELD

The present disclosure generally relates to technical problems encountered in machine learning. More specifically, the present disclosure relates to a machine-learned model that is trained to include incrementality estimation.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is job listing content. Here, job listings are posted to a social networking service and these job listings are presented to users of the social networking service, either as results of job searches performed by the users in the social networking service, or as unsolicited content presented to users in various other channels of the social networking service.

The online network typically will charge the entities that post certain types of content, such as job listings (e.g., companies, recruiting firms, etc.) a fee for posting the content and for having the content be displayed in a more prominent position (e.g., higher in a list) than it would have been displayed if no fee had been charged. In some circumstances the charge for the content is an ongoing fee based on the number of users who view the content. More particularly, in some circumstances it is beneficial to allow companies to pay for "sponsored" content, which is surfaced to users in contexts within the graphical user interfaces of the online network in which it would not have ordinarily been presented, and to mix these sponsored pieces of content with non-sponsored pieces of content (also called "organic" content). It should be noted that while non-sponsored pieces of content may commonly be "free" in that the poster is not charged for either posting the content or for displaying the content more prominently, it is possible for a piece of content to be non-sponsored while there is still a fee involved, such as if a fee is charged for every job listing that is posted (e.g., all organic pieces of content have fees) and job posters may elect to pay an additional fee to sponsor the piece of content in order to display the content more prominently.

In light of the sponsored content framework, a machine-learned model may be used to recommend a budget to a content poster for each piece of content. This recommended budget attempts to provide the content poster with a budget level that will provide the best performance (e.g., a particular number of applications for the job). It is based on a calculation regarding an estimate of how much additional advancement towards this performance will be accomplished by increasing the budget a certain amount (e.g., increasing the budget by 20% will result in 25% more applications).

Past machine-learned models in this area suffer from inaccurate recommendations due to inaccuracies in the estimate of how much additional advancement will be accomplished by increasing the budget a certain amount. More particularly, these machine-learned models rely upon historical information in which biases can appear in the data. For example, comparing a high-budget job posting to a low-budget job posting using historical data may indeed reveal a significant increase in performance (e.g., number of applications) for the high-budget job posting over the low-budget job posting, but there could be a bias in the data in that job postings that have been posted with high budgets may just be ones that have fewer prerequisites and thus attract more candidates. Alternatively, the opposite bias could appear in the data, such as where the high-budget job is one that is for a hard-to-fill position, and thus may attract fewer candidates.

What is needed is an improved machine-learned model that is able to accurately estimate additional advancement in performance.

BRIEF DESCRIPTION OF THE DRAWINGS

Some embodiments of the technology are illustrated, by way of example and not limitation, in the figures of the accompanying drawings.

FIG. 8 is a flow diagram illustrating a method for training a machine-learned model in accordance with an example embodiment.

DETAILED DESCRIPTION

Overview

Figure 1:
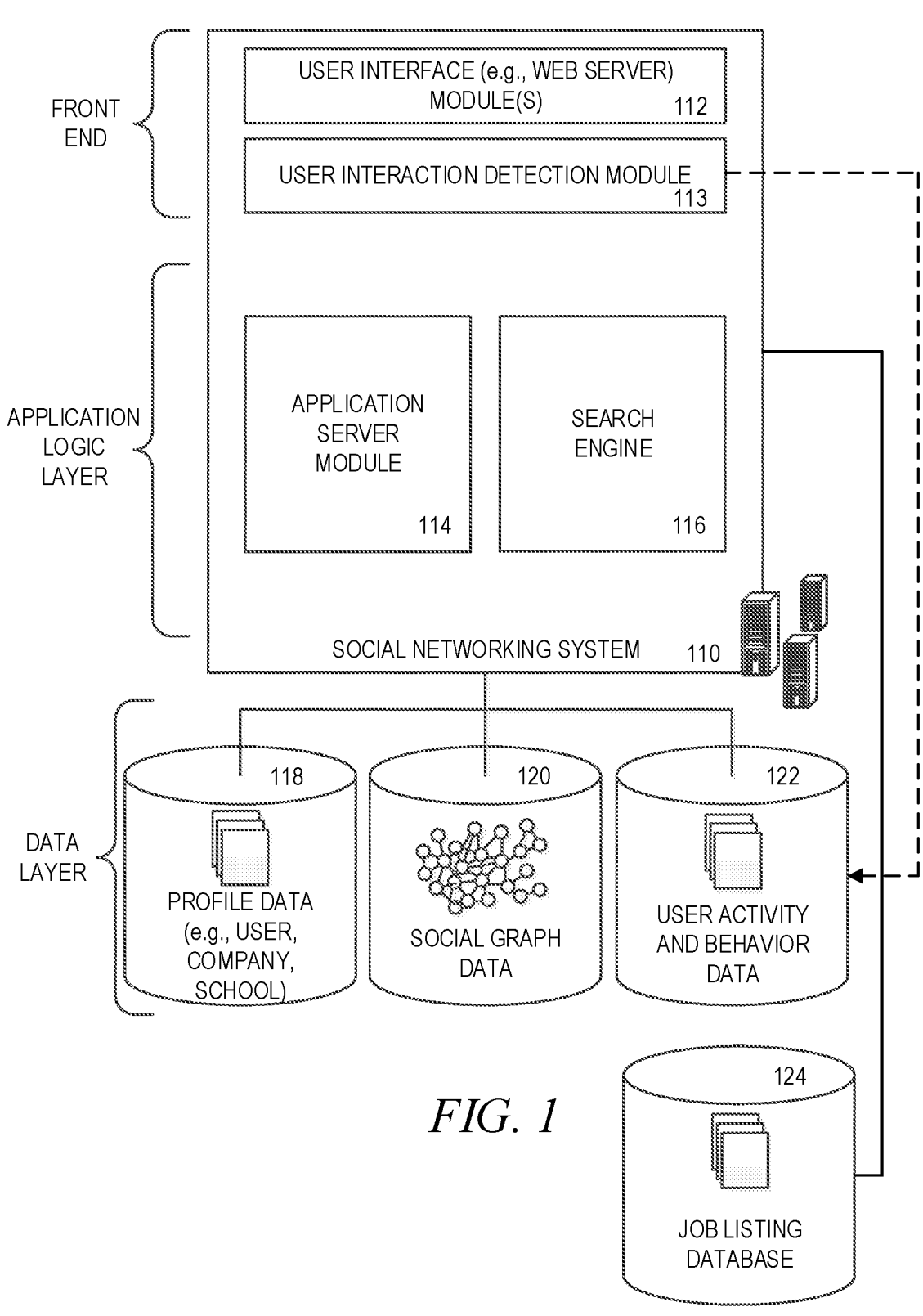
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a machine-learned model is trained to forecast a performance-based metric for a piece of content based on a budget applied to the piece of content. A performance-based metric is a metric that is used to judge the effectiveness of the budget towards performance. For example, if the content is a job listing, the performance-based metric may be the number of applications for the corresponding job. Other metrics may be used for this and other types of content, such as number of interactions with the piece of content (e.g., clicks, shares, likes, etc.).

The increase in the performance-based metric that is due to a corresponding increase in budget may be termed "incrementality." Incrementality may be defined as the slope in the mapping between a committed budget for a piece of content and its expected value for the performance-based metric. The machine-learned model is trained in such a way that incrementality is built into the model. More particularly, in an example embodiment, an asymmetric budget split process is used to create two groups of training data, one for high budget and one for low budget. Rather than relying on historical data, the asymmetric budget split process applies a high budget to a piece of content in a first subgroup (e.g., group of users) and a low budget to that same piece of content in a second subgroup, and then the performance results in each subgroup are compared.

Incrementality is a slope coefficient and hence, unlike a typical metric, cannot be easily read from observational data. Rather, it should be estimated using an appropriate quasi-random variation in budget. As described earlier, using observational data can lead to biases in the data. Furthermore, proxies for incrementality do not reflect real incrementality in an unbiased fashion. For example, one proxy for incrementality may be the inverse of the price a content poster is charged (or has been charged) for an actual value of the performance-based metric (e.g., how much a job poster was charged for an actual application to the corresponding job). This too, however, can be severely biased due to substitution between sponsored and organic inventory (e.g., applies that would have occurred anyway through organic inventory even if the job poster had not been charged).

Here, "low" and "high" budget may be defined based on a split of an originally provided budget. For example, if a 60-40 split is conducted, then a $10/day budget for a piece of content may be split into a $6/day budget to produce training data from the piece of content being used on a first subgroup and a $4/day budget to produce training data from the piece of content being used on a second subgroup. Other splits, and thus other "definitions" for what is considered "low" and "high" budgets, can be used, as will be discussed in more detail below.

In an example embodiment, each subgroup is a random selection of users from a particular number of users whose data will be utilized to generate training data. These subgroups may be the same size (or at least roughly the same size). Asymmetric budget split ensures unbiasedness in the machine-learned model that cannot be accomplished using past machine-learned models, which are unable to handle asymmetry.

Description

The disclosed embodiments provide a method, apparatus, and system for estimation of incremental increases in performance of a piece of content. It should be noted that for ease of understanding, a particular type of content, specifically job listings, will be described in detail in this disclosure. Nothing in this disclosure shall be read, however, as specifically limiting implementation of the techniques described herein to job listings, and the claims shall not be interpreted as being limited to job listings unless explicitly stated.

In an example embodiment, sponsored pieces of content are posted within an online network such as a social networking service. Each sponsored piece of content is associated with a daily and/or other time-based budget that is spent as users are provided with impressions of the piece of content. An impression may be considered to be a display of the sponsored piece of content in a manner that causes a charge to be incurred. In an example embodiment, displaying a sponsored piece of content in a list of pieces of content is considered to be an impression, while subsequent interactions the user has with the sponsored piece of content are called "interactions". In the case of job listings, these subsequent interactions may include clicking on the job listing to view the job listing in more detail, applying to the job listing, and/or performing other actions related to the job listing. As a result, prices for sponsored pieces of content may be dynamically adjusted so that a daily budget, set by an entity posting the sponsored piece of content, can be consumed over the course of the day instead of running out too early and/or failing to be used up by the end of the day. Additionally, prices for sponsored content impressions may also be dynamically adjusted to improve application rates, applicant quality, and/or other performance factors related to the sponsored pieces of content.

It should be noted that the specific use case where the content is job listings will be described throughout this disclosure. One of ordinary skill in the art will recognize, however, that the same concepts may be applied to other types of content, and nothing in this disclosure shall be interpreted as limiting the scope of protection to only job listings embodiments, unless explicitly stated.

Regardless of how the budget is initially set, it is important to be able to accurately forecast performance for a variety of reasons. First, this forecast may be used to recommend a budget to a content poster. Second, this forecast may be used in a graphical user interface (GUI) tool in which a prediction of performance of a piece of content can be dynamically updated based on different input budgets presented by a content poster. Third, this forecast may be used for measuring and monitoring performance and management to ensure the health and efficiency of the marketplace.

In an example embodiment, a machine-learned model is trained to forecast a performance-based metric for a piece of content based on a budget applied to the piece of content. This machine-learned model incorporates an asymmetric budget split approach in order to generate two separate sets of training data used to train the machine-learned model—a high-budget set and a low-budget set.

More particularly, a global set of users whose data, such as activity data (e.g., applications, clicks, etc.) can be used to generate training data is obtained. For example, this may include a set of all active users of an online network. Users are randomly selected from this set for inclusion in either a first subgroup or a second subgroup. In an example embodiment, the first subgroup and the second subgroup are equal or substantially equal in size.

For each piece of content to be used in the training data, a high-budget version of the piece of content and a low-budget version of the piece of content are used, and high and low-budget versions of the piece of content are randomly assigned to either the first or second subgroup of users. High-budget vs. low-budget refers to the amount paid to sponsor the piece of content over a period of time, as opposed to the quality of the piece of content itself. Indeed, in an example embodiment, the high-budget version of the piece of content and the low-budget version of the piece of content are identical with respect to the content itself and only differ in the amount paid to sponsor it. The dividing line between high-budget and low-budget may be set at any amount, and thus the absolute amount paid in each category is not as relevant as the relative amounts. In an example embodiment, for each piece of content, the budget in the "high-budget" category is higher in amount than the budget in the "low-budget" category.

In the example where the pieces of content are job listings, the high-budget version of the job listing and the low-budget version of the job listing are used in their respectively-assigned subgroups as being available as search and/or recommendation results as per the search and/or recommendation models already in place. Results from the different subgroups are then observed and compared. For example, the number of applications for the job listing from the first subgroup are compared with the number of applications for the job listing from the second subgroup. Incrementality may be calculated as the difference in performance (such as number of applications) between the high-budget and low-budget version of the job listing, relative to the difference in budget between the high-budget and the low-budget version of the job listing. Since the same job listing is being observed in both subgroups, the risk of bias is eliminated.

In addition to or in lieu of an actual calculation to determine incrementality, the observations from the different subgroups may be used as training data when training a machine-learned model to forecast content performance in an online network. This essentially builds the incrementality calculation into the machine-learned model.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based API requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of job listings. These job listings may be posted by job posters (entities that perform the posting, such as businesses) and stored in job listing database 124.

Figure 2:
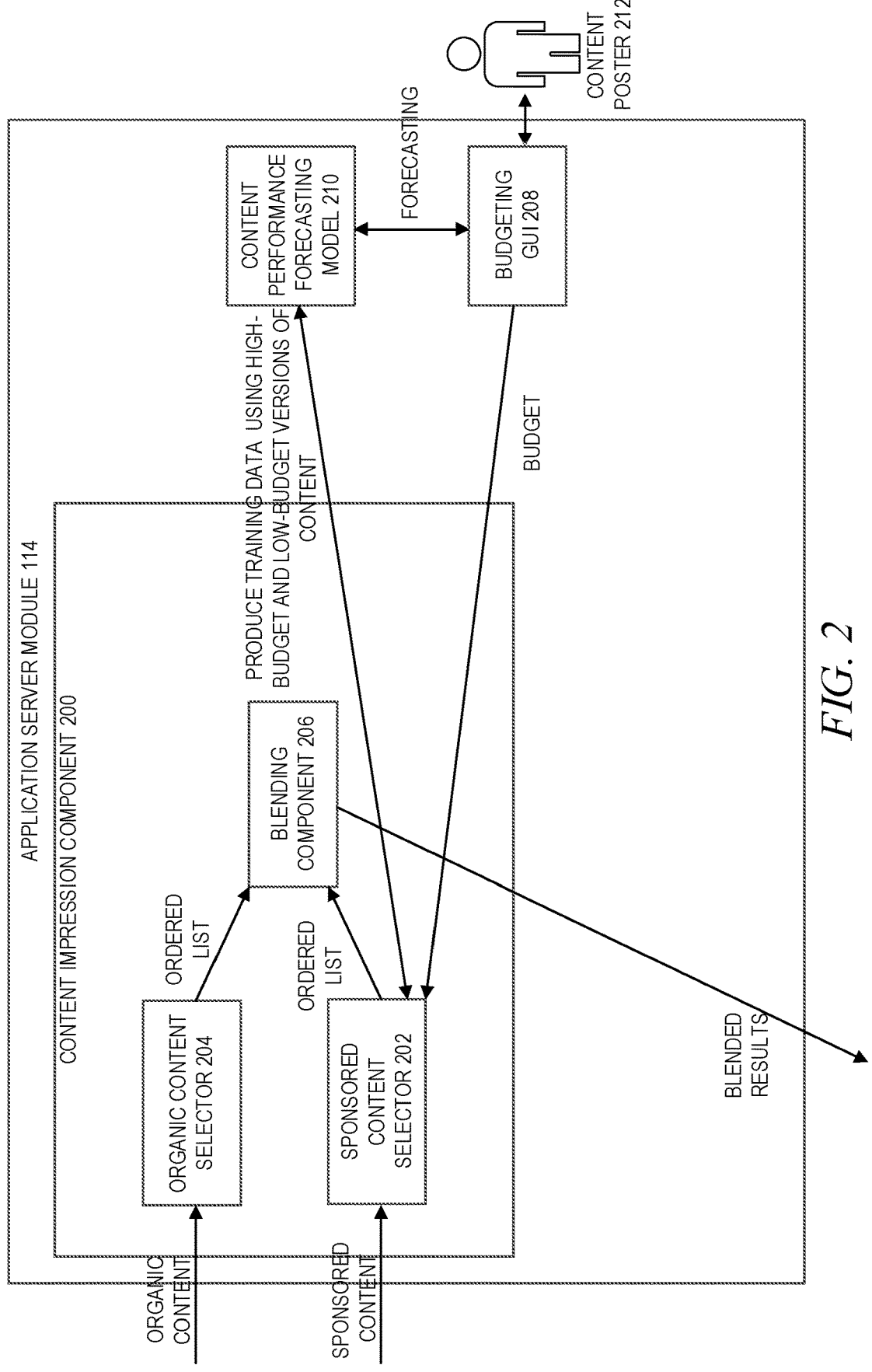
FIG. 2 is a block diagram illustrating application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, in FIG. 2 only those components that are relevant to the present disclosure are depicted.

A content impression component 200 may receive, at runtime, one or more job listings and determine which users of the online network to present the job listings to as "impressions". An impression is a single display of the job listing in a graphical user interface. There may be numerous ways these impressions may be presented and numerous channels on which these impressions may be presented. For example, the impressions may be presented in an email to a user, in a feed of the online network, or as results of a job search. Some of these impressions may be for job listings where the corresponding entity that posted the job listing has agreed to pay for the impression. Such impressions are called "sponsored impressions". It should be noted that there is a distinction between the corresponding entity having agreed to pay for the impression and the corresponding entity actually paying for the impression. It is possible that the entity may have agreed to pay for an impression but, at the time the impression is made, the daily budget established by the entity has been used up, and thus it becomes possible for the sponsored impression to be displayed without an actual charge being applied to the entity's account. Alternatively, job posters may pay for clicks instead of impressions.

More particularly, companies may establish a daily budget they want to spend and a cost per impression based on a predicted number of impressions that they believe will occur each day. The actual display of the job listings, however, is based on a variety of factors that may vary based on the individual sets of users potentially served the job listing on a particular day.

All of these determinations may be considered by a sponsored content selector 202, which may consider information about the current user (i.e., the user for whom the piece(s) of content are being considered for display), the channel in which the display may occur, and the content itself (such as how closely features of the content match attributes of the user, or what the user is searching for (e.g., a search query submitted by the user)) to identify an ordered list of sponsored pieces of content available for display to the user in the channel. In this context, "channel" refers to a type of user interface or portion of a user interface on which content may be displayed. For example, a social networking service may provide multiple user interfaces or portions of user interfaces where job listings may be displayed to a user, including a job search channel (where users perform explicit searches for job listings, such as by specifying a job search query), a jobs-you-may-be-interested-in channel (where job listings are presented to a user who has not performed an explicit search, based on information the social networking service knows about the user), an email channel (where job listings are presented in emails rather than as part of a web-based user interface), and a feed channel (where job listings are presented as part of a content feed), where other types of feed content, such as news articles and updates about the user's connections, are intermingled.

In an example embodiment, the sponsored content selector 202 implements a model that determines the ordered list of sponsored pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the sponsored content selector 202 bases its selection on a combination of the relevance of the sponsored pieces of content to the user and/or the search performed by the user and how efficiently displaying each of the sponsored pieces of content will utilize the budgets set for the sponsored pieces of content by the job posters.

Regardless of how it is determined, the sponsored content selector 202 outputs an ordered list of sponsored pieces of content.

Separately, an organic content selector 204 identifies an ordered list of organic pieces of content available for display to the user in the channel. This may be performed using, for example, information about the current user, the channel in which the display may occur, and the content itself (such as how closely features of the content match attributes of the user, or what the user is searching for (e.g., a search query submitted by the user). The organic pieces of content may be pieces of content posted by job posters who have not elected to sponsor the pieces of content.

In an example embodiment, the organic content selector 204 implements a model that determines the ordered list of organic pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the organic content selector 204 bases its selection on the relevance of the organic pieces of content to the user and/or the search performed by the user.

The ordered list of sponsored pieces of content and the ordered list of organic pieces of content are then passed to a blending component 206. The blending component 206 determines an ordering in which to present a combination of sponsored pieces of content and organic pieces of content. This may be performed in a number of different ways. In one example embodiments, there are fixed slots in a list of results that are assigned to either sponsored or organic results. For example, if a graphical user interface is designed to output ten results at a time, a fixed slot assignment may indicate that the first two results on every results page are organic results, the next two are sponsored results, the next three are organic results, and so on. In an alternative embodiment, the slot assignments are dynamically adjusted. In a further example embodiment, the blending component 206 may remove any duplicate pieces of content using a duplicate remover. Unlike pure advertisements, sponsored pieces of content only vary from organic pieces of content by virtue of their respective poster being willing to pay for an impression. Thus, it is possible for a piece of content, such as a job listing, to be both sponsored and organic. This situation can arise, for example, if a company is willing to pay a social networking service to have an impression of the job posting be displayed in results on the social network service, but where the company has also posted the same job posting on a third-party web site which is crawled by the social networking service to obtain job listings which are unpaid. In an example embodiment, if the same piece of content exists in both the ordered list of sponsored pieces of content and the ordered list of organic pieces of content, blending component 206 removes that piece of content from the ordered list of organic pieces of content. In another example embodiment, if the same piece of content exists in both the ordered list of sponsored pieces of content and the ordered list of organic pieces of content, the lower ranked piece of content is removed.

The runtime output of the blending component 206 is an ordered list of results, likely with a mixture of sponsored content and organic content, which can be sent to a graphical user interface for display to a user.

The budgets sent to the sponsored content selector 202 may be sent via a budgeting GUI 208. The budgeting GUI 208 provides a place for content posters to enter their budget for sponsored placement of the content. As will be described in more detail later, in an example embodiment the budgeting GUI 208 may also provide a place where the content posters are able to see forecasts for performance of their content (based on a performance-based metric), and use this information to set the respective budgets for the pieces of content. In one example embodiment, a slider may be provided where a content poster 212 can increase or decrease the amount of the budget for a piece of content, and see a dynamically updated forecast of performance based on the budget indicated by the current position of the slider.

The forecast of performance for a particular budget may be obtained from the content performance forecasting model 210. The content performance forecasting model 210 uses high-budget and low-budget versions of the same pieces of content, on different randomly selected subgroups of users, and based on those results the content performance forecasting model 210 is trained to accurately predict content performance without bias. This production of training data includes promoting the first piece of content to users in the first subgroup using the budget value assigned to the first subgroup, which includes assigning a bid for each of one or more impressions of the first piece of content based on the budget value assigned to the first subgroup. This bid is then used by a sponsored content selector 202 to determine how high to rank the first piece of content among other sponsored pieces of content to display to users in the first subgroup, an impression being a single display of the first piece of content to a single user. A similar technique is used to promote the first piece of content to users in the second subgroup.

Figure 3:
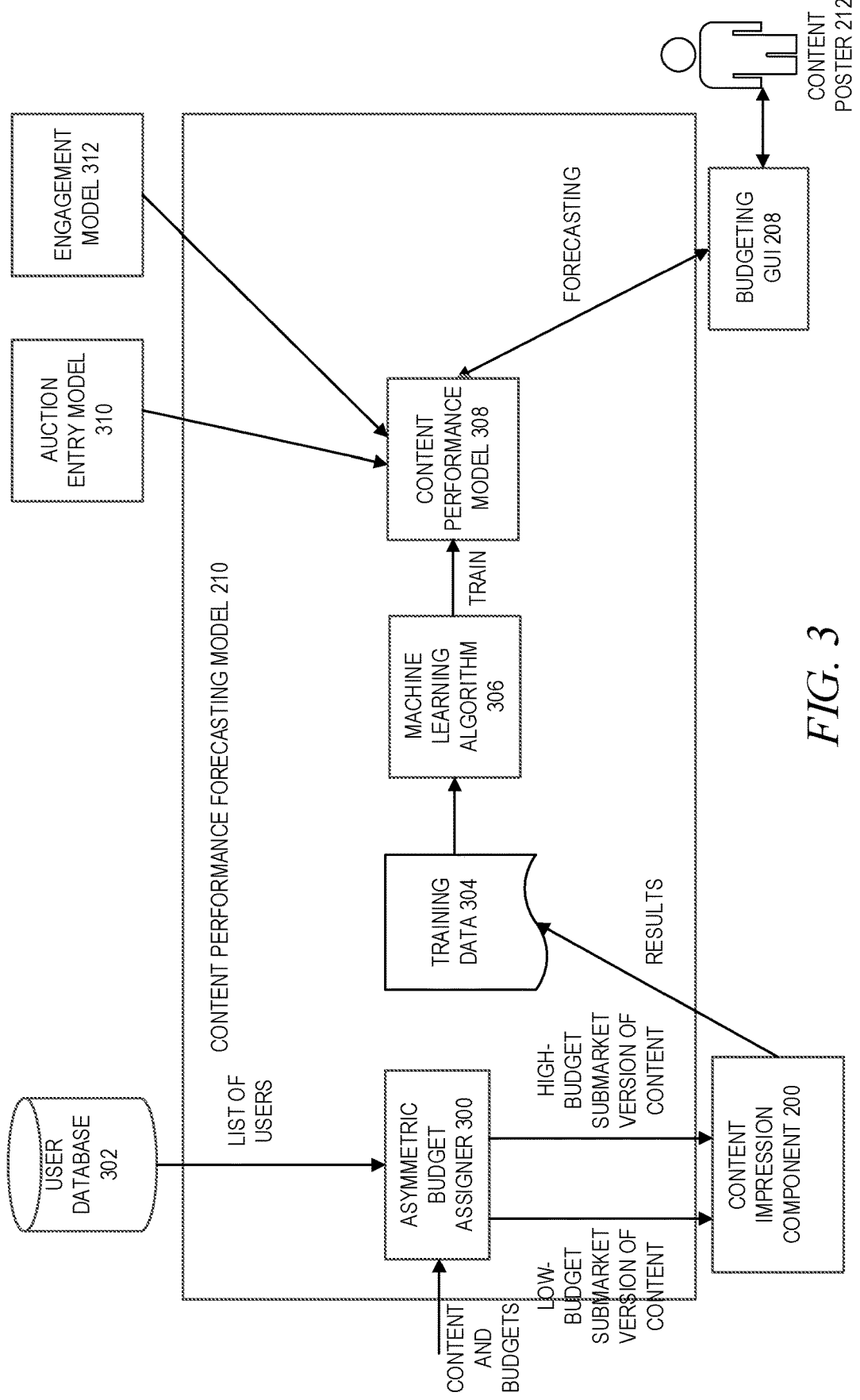
FIG. 3 is a diagram illustrating the content performance forecasting model in more detail, in accordance with an example embodiment.

FIG. 3 is a diagram illustrating the content performance forecasting model 210 in accordance with an example embodiment. A budget assigner 300 may obtain content and associated budget. In other words, each piece of content has its own budget. These pieces of content may be ones that are selected for use in training the content performance forecasting model 210. For each of these pieces of content, the budget corresponding to the piece of content may then be split asymmetrically in two (i.e., in unequal amounts). The higher budget portion may be called "high budget" and the lower budget portion may be called "low budget", although this is not indicative of any requirement that the respective budgets be any particular levels. Any split is permitted, and thus a 51-49 split (where one portion represents 51% of the original budget and another portion represents 49% of the original budget) would still result in 51% portion being called "high budget" and the 49% portion being called "low budget". Likewise a 98-2 split is also possible. Nevertheless, a typical range may be somewhere between 50-50 and 70-30.

In an example embodiment, the split is based on a fixed amount selected by an administrator, such as 60-40 split.

This may be selected based on empirical observation. In another example embodiment, however, the split may be dynamically determined using a rules-based algorithm that applies rules to one or more metrics to determine a split, or learned via a machine-learning algorithm.

The asymmetric budget split fraction may be defined as a, namely the split needed to achieve a desired level of statistical precision in the incrementality estimate. The incrementality estimate comes from comparing performance of high and low budget job versions. Hence, the variation from a binary treatment $\text{BudgetHigh}_k \in \{0, 1\}$ may be used to determine the level of a needed to reach a desired level of statistical precision. In the following, an analysis for this binary treatment relating it to the estimate of incrementality is conducted.

For the binary treatment $\text{BudgetHigh}_k$ consider the following regression where k denotes a job posting version:

$$\text{Applies}^k = \text{cons} + \beta \times \text{BudgetHigh}_k + \epsilon_k \tag{1a}$$

The coefficient $\beta$ is related to incrementality $\delta$ (defined as $\delta$=d Number of Applies/d Budget) through the equation $$\beta = \delta \cdot (2\alpha - 1) \cdot \text{Budget}, \tag{2a}$$

where Budget is a job listing's daily budget and $\alpha$ is the fraction of a job listing's budget assigned to the high-budget job listing version as defined above.

Derivation: denote by $f(\ )$ a job listing version's value delivery function, that maps budget into expected number of applies. Then $\beta = f(\alpha \cdot \text{Budget}) - f((1-\alpha) \cdot \text{Budget}) = (\alpha - (1-\alpha)) \cdot \delta \cdot \text{Budget} + ((1-\alpha)) \cdot \text{Budget}) - f((1-\alpha) \cdot \text{Budget}) = (2\alpha - 1) \cdot \delta \cdot \text{Budget}$, where the second equality assumes linearity in the neighborhood [$\alpha \cdot \text{Budget}$, $(1-\alpha) \cdot \text{Budget}$] and uses the definition of incrementality $\delta$.

Suppose one wants the 95% confidence interval of the incrementality estimate to be a fraction $\phi$ of the level of $\delta$(i.e., [$(1-\phi) \cdot \delta$, $(1+\phi) \cdot \delta$]). As $\beta$ and $\delta$ are linearly related, a power calculation can be performed for $\beta$ and it can be related to incrementality $\delta$ through equation (2a).

For the necessary precision in terms of p (defined as the randomization fraction, typically being 0.5), one can calculate the minimum detectable effect size (MDE) for $\beta$ as if one attempted to reject the null-hypothesis of $\beta=0$ with a threshold for the t-statistic of 1.96/$\phi$. (This is because $$1.96 = \frac{\beta - (1 - \phi)\beta}{SE(\hat{\beta})} = \frac{\phi\beta}{SE(\hat{\beta})} = \phi t \Rightarrow t = \frac{1.96}{\phi}.)$$

Hence:

$$MDE(\beta) = \left(\frac{1.96}{\phi} + 0.8\right) \cdot \sqrt{\frac{\sigma^2}{Np(1-p)}}, \tag{3a}$$

where all parameters are defined as in the table below. Using $(\beta)=M(\delta)\times(2\alpha-1)\times\text{Budget}$, one arrives at $$\alpha = \left(1 + \left(\frac{1.96}{\phi} + 0.8\right) \cdot \frac{\sigma}{\sqrt{Np(1-p)}} \cdot \frac{1}{MDE(\delta) \times \text{Budget}}\right)\Big/2.$$

| Component | Info |
| --- | --- |
| $\phi$ | Desired width of the 95% confidence interval estimate |
| $\sigma$ | Standard deviation of applies (or any other performance metric) per budget split market (one submarket), typcioally winsorized at the 95th percentile |
| $Np(1-p)$ | N: number of active jobs with a budget. p = 0.5 (equal randomization) |
| $MDE(\delta)$ | Estimate of incrementality to detect |
| Budget | Average budget among all active jobs with a budget |
| $\alpha$ | Resulting level of the asymmetric budget split fraction |

Since each piece of content has its budget split into two unequal portions, the result is that there are two versions of each piece of content: a "high budget" version and a "low budget" version. Each of these versions is then randomly assigned to a different subgroup of users. More particularly, the asymmetric budget assigner 300 obtains a list of users from a user database 302. This list of users may be ones selected to be used to train the content performance forecasting model 210, although in some embodiments all available users in the online network may be used for this purpose and thus the list of users is a list of all available users. Regardless, the asymmetric budget assigner 300 randomly assigns the users in the list of users into either a first subgroup or a second subgroup. These subgroups may be the same size (or at least substantially the same size; if the list of users has an odd number of users in it, then it would be impossible for the subgroups to be exactly the same size).

The high-budget version of a piece of content is then randomly assigned to either the first or second subgroup, with the low-budget version assigned to the subgroup that the high-budget version was not. The content impression component 200 then serves the version of the piece of content to users in the subgroup to which that version is assigned. Thus, for example, if the high-budget version is assigned to the first subgroup and the low-budget version is assigned to the second subgroup, then the high budget is used to place the piece of content as sponsored pieces of content served to users in the first subgroup, and the low budget is used to place the piece of content as sponsored pieces of content served to users in the second subgroup.

The results from both subgroups are then received from the content impression component 200 and may be designated as training data 304. The training data 304 may then be fed as input to a machine learning algorithm 306 to train a content performance model 308. The content performance model 308 is trained to output a forecast of performance according to a performance-based metric of some sort. In one example embodiment, the performance-based metric is applications to a job associated with a job posting (where the job posting is the piece content). In another example embodiment, the performance-based metric is clicks on the piece of content.

The training may include using the training data 304, but may also use features extracted from other data, such user features, content features, and channel features, or features obtained from other models, such as from an auction entry model 310 and/or engagement model 312. In an example embodiment, the machine learning algorithm 306 is a linear regression algorithm. In another example embodiment, the machine learning algorithm 306 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

Figure 4:
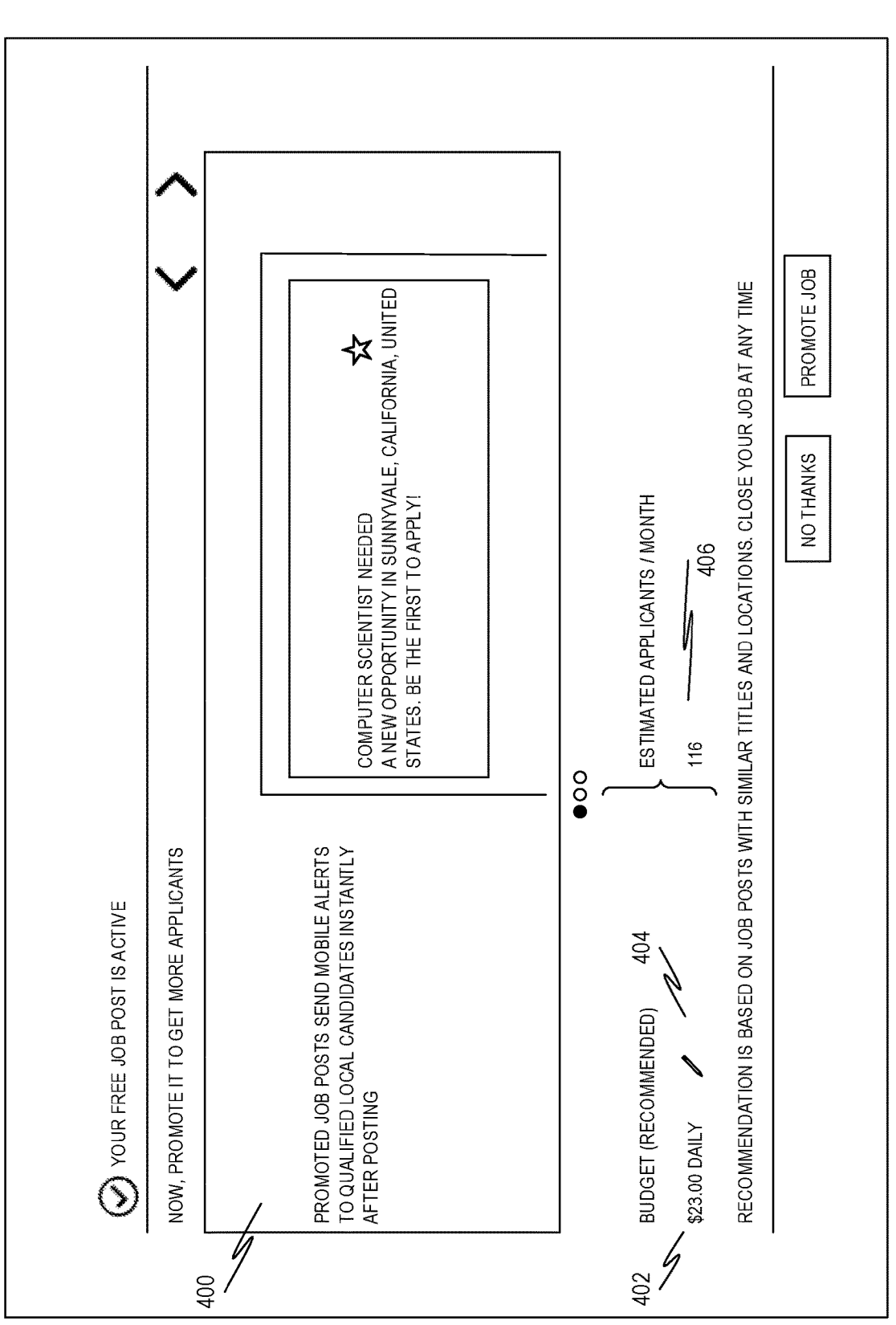
FIG. 4 is a screen capture illustrating a first screen of a budgeting GUI in accordance with an example embodiment.

FIG. 4 is a screen capture illustrating a first screen 400 of a budgeting GUI 208 in accordance with an example embodiment. On this first screen 400, a recommended budget 402 is displayed along with a button 404 that the user may click on to edit the recommended budget to a custom budget. Also displayed is an estimated amount of applicants/month 406 based on the recommended budget 402. This estimated amount of applicants/month 406 is obtained by the budgeting GUI 208 from the content performance forecasting model 210, which reflects a forecasted value based on the budget (in this screen, the recommended budget 402).

Figure 5:
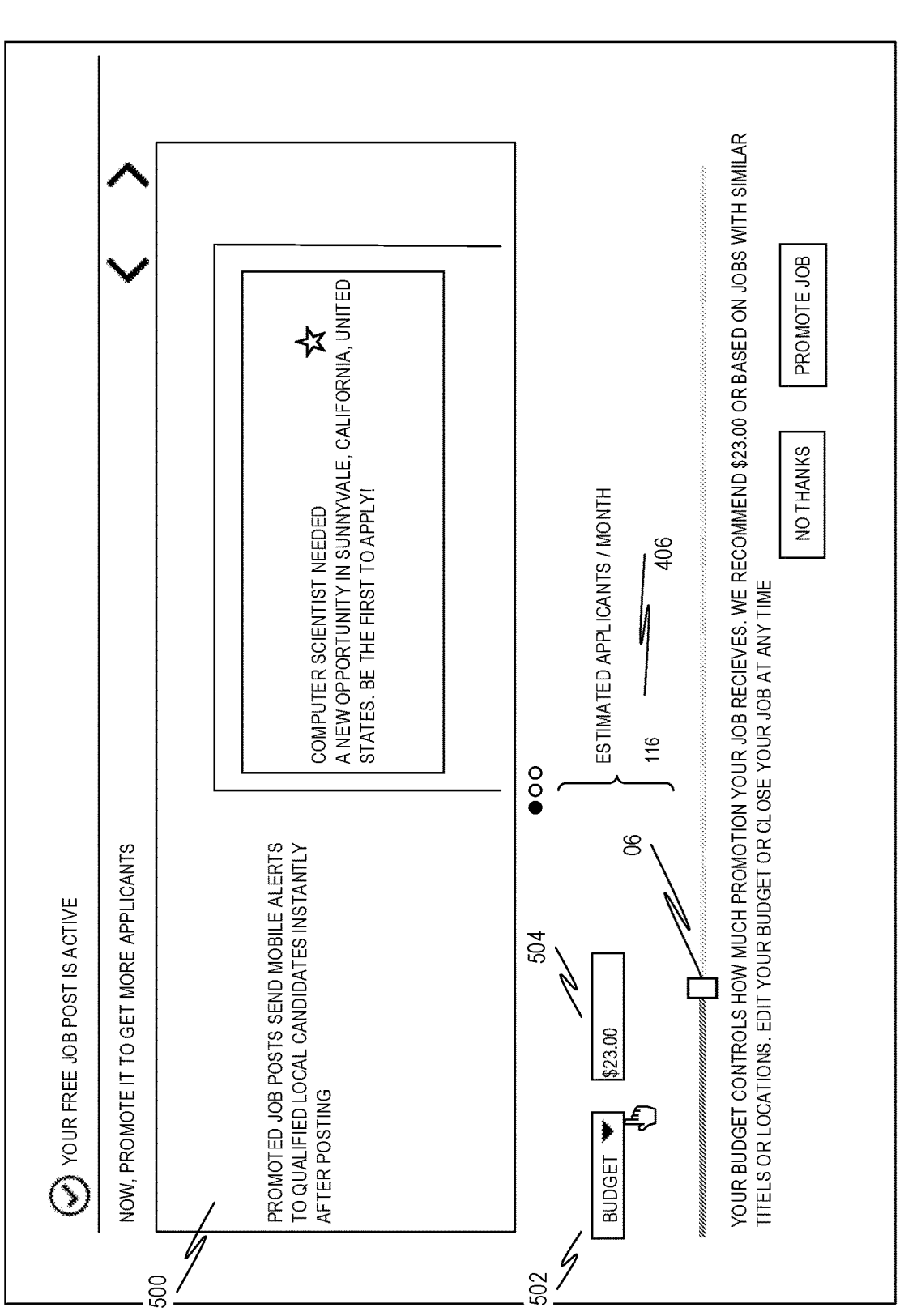
FIG. 5 is a screen capture illustrating a second screen of the budgeting GUI in accordance with an example embodiment.

FIG. 5 is a screen capture illustrating a second screen 500 of the budgeting GUI 208 in accordance with an example embodiment. Here, the user has selected button 404 from FIG. 4, which brings up a drop down button 502 where the user can select a time period for which the budget will cover (e.g., daily, weekly, monthly). Also displayed is an input box 504 where the user can type in an exact budget number, but a slider bar 506 is also provided that the user can select to lower and raise the budget.

Figure 6:
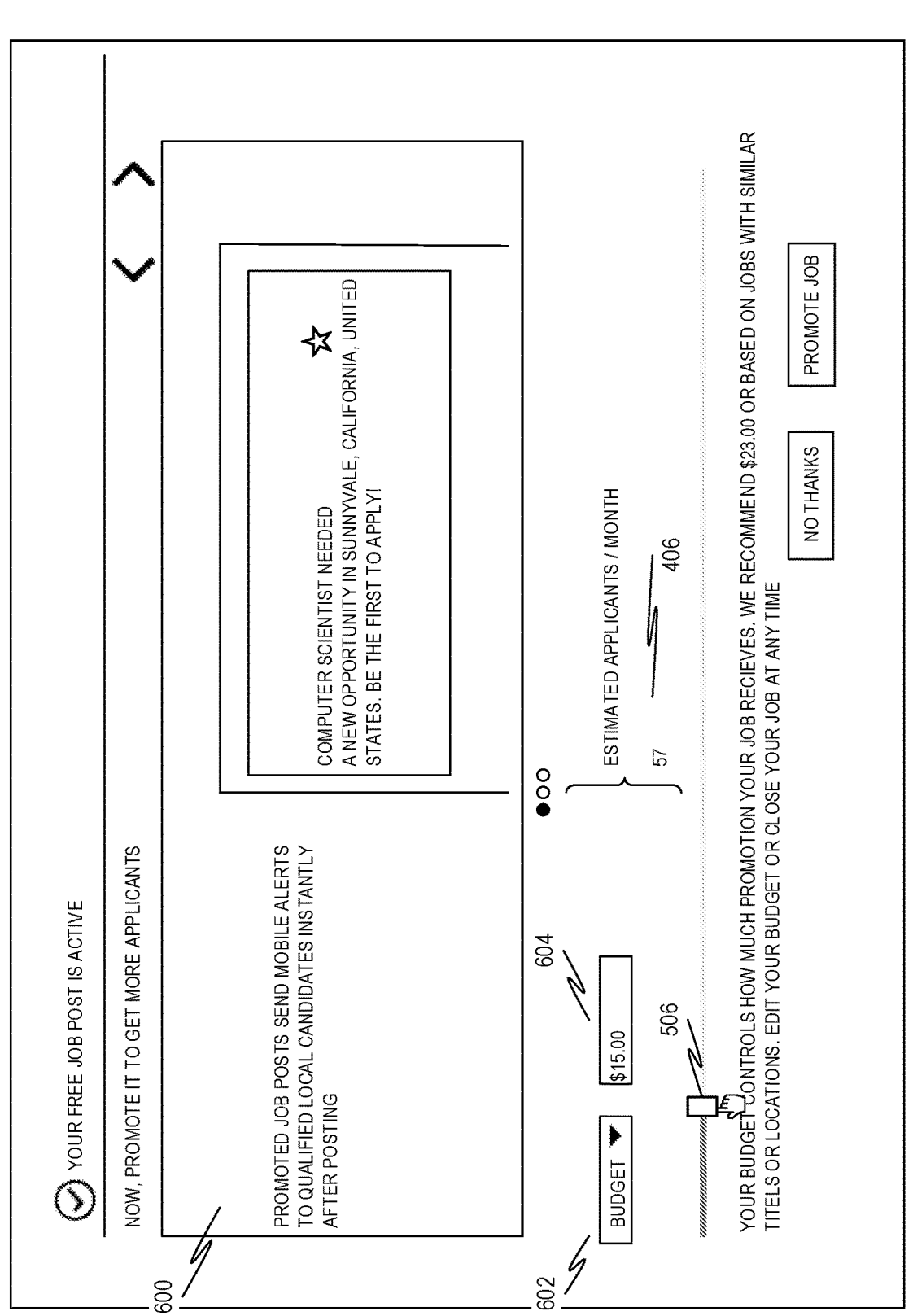
FIG. 6 is a screen capture illustrating a third screen of the budgeting GUI in accordance with an example embodiment.

FIG. 6 is a screen capture illustrating a third screen 600 of the budgeting GUI 208 in accordance with an example embodiment. Here, the user has moved the slider bar 506 down to reduce the budget, which has caused a corresponding change in the estimated amount of applicants/month 406. This estimated amount is based on the forecast from the content performance forecasting model 210, using the budget provided by the user based on the position of the slider bar 506.

Figure 7:
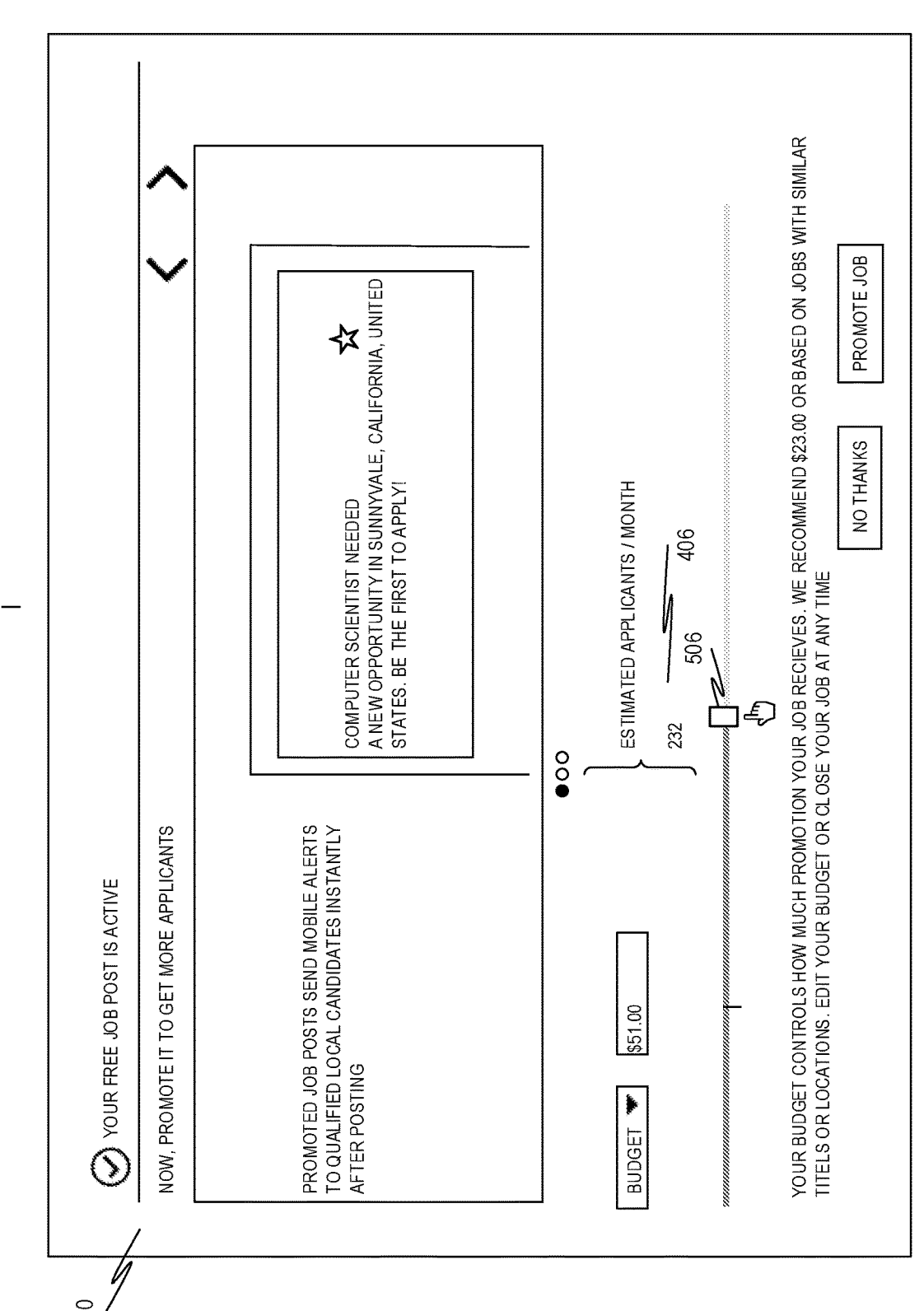
FIG. 7 is a screen capture illustrating a fourth screen of the budgeting GUI in accordance with an example embodiment.

FIG. 7 is a screen capture illustrating a fourth screen 700 of the budgeting GUI 208 in accordance with an example embodiment. Here, the user has moved the slider bar 506 up to increase the budget, which has caused a corresponding change in the estimated amount of applicants/month 406. This estimated amount is based on the forecast from the content performance forecasting model 210, using the budget provided by the user based on the position of the slider bar 506.

In other example embodiments, the incrementality estimates may be used in other ways other than as part of a forecasting model. For example, budget-aware forecasts may be built based on segment-level estimates of incrementality, each segment being a different category of content. Here, first, heterogenous incrementality estimates are obtained at the segment level (i.e., as a function of job listing features). These incrementality estimates are derived by comparing the difference in the performance metric between high and low budget job versions relative to the difference in budget between the high and low budget job versions. Second, these segment-level estimates can be directly used for budget-aware forecasts.

In another example, budget-aware forecasts may be built based on job posting-level simulations calibrated through market-level incrementality estimates, as derived as explained above. Here, an auction replay for an individual job posting may be performed. An auction replay is a tool for simulation of content placement and display, where auctions are used to determine how to place content, such as where content is placed more prominently if the content provider bids higher for display of the content than other content being displayed. Auction replay uses historical data of such auctions and simulates the outcome of these past auctions if a piece of content had a different budget level. This allows simulation of performance of a piece of content (as measured by, for example, number of impressions, clicks, applies, etc.) at different budget levels. In sum, auction replay is a simulation tool that outputs data on performance at different hypothetical budget levels for each job listing.

One technical issue with auction replay is that it can be biased. More particularly, the simulated mapping between budget and performance may not correspond to the actual mapping between budget and performance, due to the issues mentioned earlier. This may be addressed by calibrating the auction replay through incrementality estimates obtained from causal estimation based on data obtained through asymmetric budget split (to ensure that simulated performance of job postings in the simulation corresponds to performance of job postings estimated based on data obtained through asymmetric budget split).

FIG. 8 is a flow diagram illustrating a method 800 for training a machine-learned model in accordance with an example embodiment. At operation 802, a first piece of content and a first budget for the first piece of the content are obtained. In an example embodiment, the first budget is obtained from a first content poster, but in other example embodiments the first budget may be obtained from other sources, or created by the online service operating the method 800. The first budget is indicative of a first value the first content poster is willing to pay over a particular time period to promote the first piece of content. At operation 804, the first budget is split by value into a high budget value and a low budget value, the high budget value being different and higher than the low budget value. At operation 806, each user in a first group of users is randomly assigned into a first subgroup or a second subgroup. At operation 808, the high budget value is randomly assigned to either the first subgroup or the second subgroup and the low budget value is assigned to the subgroup to which the high budget value was not assigned.

At operation 810, the first piece of content is promoted to users in the first subgroup using the budget value assigned to the first subgroup. At operation 812, the first piece of content is promoted to users in the second subgroup using the budget value assigned to the second subgroup. At operation 814, results produced by promoting the first piece of content to users in the first subgroup and results produced by promoting the first piece of content to users in the second subgroup are designated as training data. Designating something as training data may be accomplished in a variety of ways, from having a field in a record indicating the data is training data, to simply using the training data as input to a machine learning algorithm used to train a model. It should be noted that while the above steps describe performing the asymmetric budget split for a single piece of content (the first piece of content), in an example embodiment, these steps are repeated for multiple pieces of content, to create a more complete set of training data. Indeed, in some example embodiments, the asymmetric budget split operations are performed on a large number of pieces of content, possibly all pieces of content that have budgets. At operation 816, a first machine-learned model is trained using a machine learning algorithm by feeding the training data into the machine learning algorithm. This training includes training the first machine-learned model to forecast a value for a performance-based metric for a given piece of content with a given budget. It should be noted that while this figure depicts a single training operation, in an example embodiment, the machine-learned model may be trained multiple times. This allows the model to be retrained when, for example, new training data is created or user feedback about the performance of the machine-learned model is received.

At operation 818, a graphical user interface is caused to be rendered. The graphical user interface may include a first screen where a user can select a second piece of content and a second screen where a user can adjust a budget for the second piece of content. At operation 820, upon receiving user input adjusting the budget for the second piece of content, information about the second piece of content and the adjusted budget for the second piece of content are sent to the first machine-learned model to receive a forecast of a performance-based metric, the graphical user interface further displaying the forecast for the adjusted budget. The second screen includes a slider that the user can slide in a first direction or a second direction, wherein sliding the slider in the first direction adjusts the budget downwards and wherein sliding the slider in the second direction adjusts the budget upwards.

Figure 9:
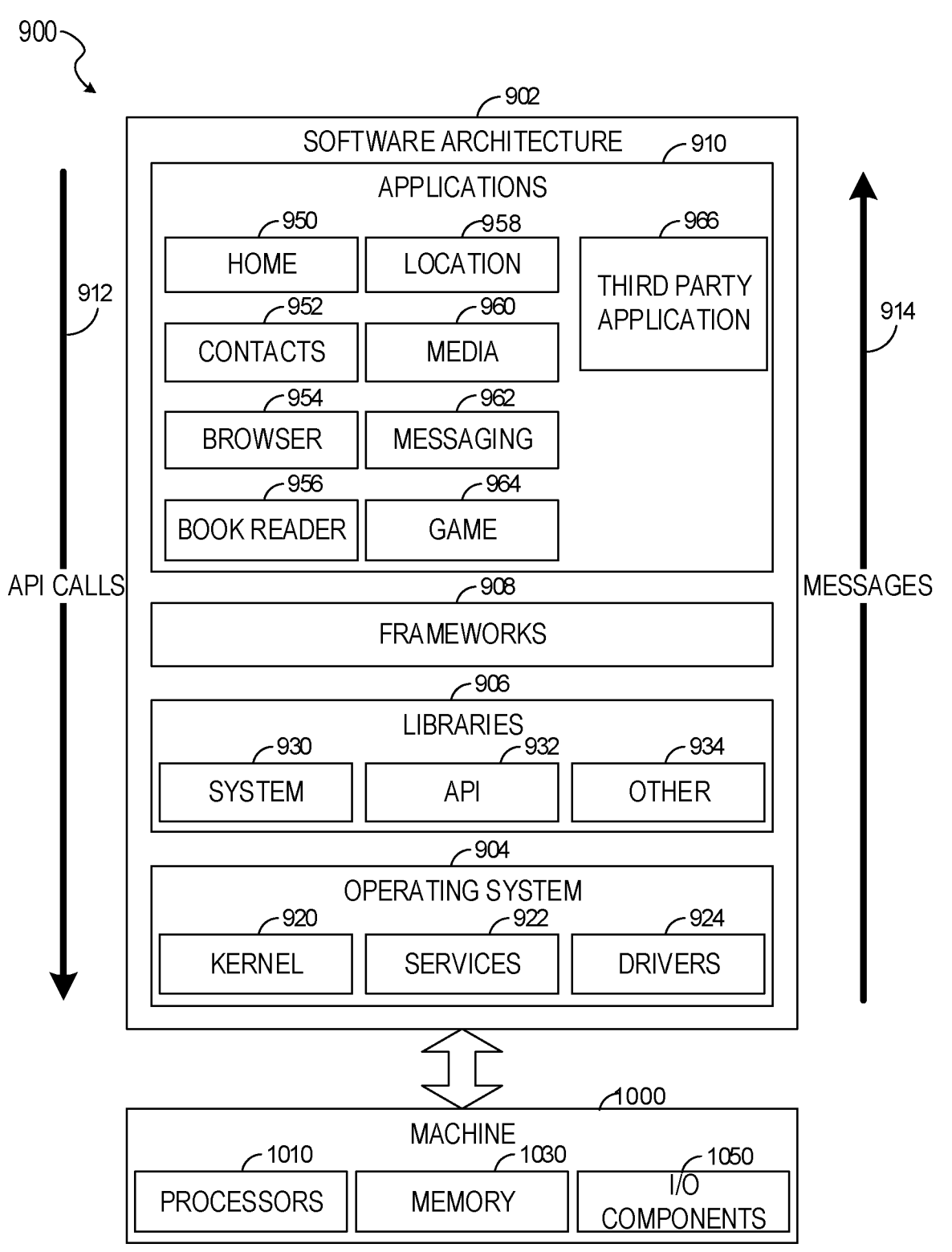
FIG. 9 is a block diagram illustrating a software architecture, in accordance with an example embodiment.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
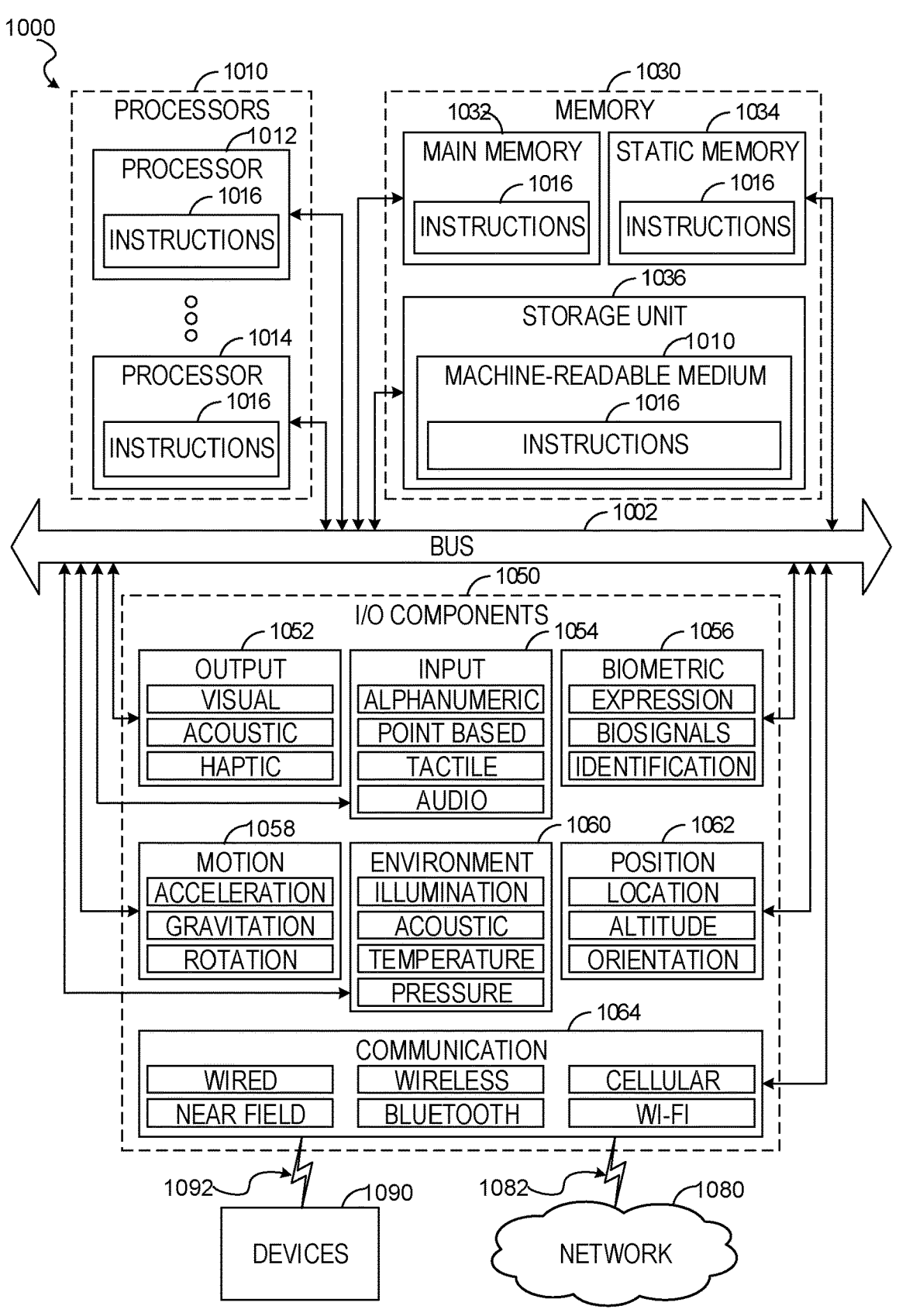
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein may be executed. For example, the instructions 1016 may cause the machine 1000 to execute the method 800 of FIG. 8. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors 1012 (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor), multiple processors 1010 with a single core, multiple processors 1010 with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1090 via a coupling 1082 and a coupling 1092, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1090 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to the processors 1010. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1092 (e.g., a peer-to-peer coupling) to the devices 1090. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A computerized method for training a first machine-learned model, comprising:
obtaining a first piece of content from a first content poster and a first budget for the first piece of content, the first budget indicative of a first value of promoting the first piece of content over a particular time period;
splitting the first budget asymmetrically into a high budget value and a low budget value, the high budget value being different and higher than the low budget value;
randomly assigning each user in a first group of users into a first subgroup or a second subgroup;
randomly assigning the high budget value to either the first subgroup or the second subgroup and assigning the low budget value to the subgroup to which the high budget value was not assigned;
causing the first piece of content to be displayed to users in the first subgroup based on the budget value assigned to the first subgroup;
causing the first piece of content to be displayed to users in the second subgroup based on the budget value assigned to the second subgroup;

designating results produced by the causing display of the first piece of content to the users in the first subgroup and the causing display of the first piece of content to the users in the second subgroup as training data;

training the first machine-learned model using a machine learning algorithm by feeding the training data into the machine learning algorithm;

generating a web page comprising a web-based user interface, the web-based user interface including a first user interface element configured to enable selection of a second piece of content, a second engageable user interface element configured to adjust a budget for the second piece of content upwards or downwards responsive to user engagement therewith, and a third user interface element displaying a first forecasted value of a performance-based metric for the second piece of content;

receiving an adjusted budget for the second piece of content responsive to a detected engagement with the engageable second user interface element of the web-based user interface;

sending information about the second piece of content and sending the adjusted budget for the second piece of content to the first machine-learned model;

generating an updated forecasted value of the performance-based metric by the first machine-learned model for the second piece of content based at least in part on the adjusted budget for the second piece of content, the updated forecasted value comprising an incremental increase or decrease in the first forecasted value; and dynamically updating the third user interface element in the web-based user interface to display the generated updated forecasted value of the performance-based metric.

2. The method of claim 1, wherein the training includes training the first machine-learned model to forecast a value for the performance-based metric for a given piece of content with a given budget.

3. The method of claim 1, wherein the machine learning algorithm is a linear regression algorithm.

4. The method of claim 1, wherein the results include a first measure of the performance-based metric in the results produced by causing display of the first piece of content to users in the first subgroup and a second measure of the performance-based metric in the results produced by causing display of the first piece of content to users in the second subgroup.

5. The method of claim 4, wherein the performance-based metric is a number of clicks on the first piece of content.

6. The method of claim 4, wherein the first piece of content is a job posting and the performance-based metric is a number of applications received for a job corresponding to the job posting.

7. The method of claim 1, wherein the second engageable user interface element includes a slider that can slide in a first direction or a second direction, wherein sliding the slider in the first direction adjusts the budget downwards and wherein sliding the slider in the second direction adjusts the budget upwards.

8. The method of claim 1, wherein the causing the first piece of content to be displayed to users in the first subgroup based on the budget value assigned to the first subgroup includes assigning a bid for each of one or more impressions of the first piece of content based on the budget value assigned to the first subgroup, the bid used by a sponsored content selector to determine how high to rank the first piece of content among other sponsored pieces of content to display to users in the first subgroup, an impression being a single display of the first piece of content to a single user.

9. A system comprising:

a non-transitory computer-readable medium having instructions stored thereon, which, when executed by a processor, cause the system to perform operations comprising:

obtaining a first piece of content from a first content poster and a first budget for the first piece of content, the first budget indicative of a first value of promoting the first piece of content over a particular time period;

splitting the first budget asymmetrically into a high budget value and a low budget value, the high budget value being different and higher than the low budget value;

randomly assigning each user in a first group of users into a first subgroup or a second subgroup;

randomly assigning the high budget value to either the first subgroup or the second subgroup and assigning the low budget value to the subgroup to which the high budget value was not assigned;

causing the first piece of content to be displayed to users in the first subgroup based on the budget value assigned to the first subgroup;

causing the first piece of content to be displayed to users in the second subgroup based on the budget value assigned to the second subgroup;

designating results produced by the causing display of the first piece of content to the users in the first subgroup and the causing display of the first piece of content to the users in the second subgroup as training data;

training the first machine-learned model using a machine learning algorithm by feeding the training data into the machine learning algorithm;

generating a web page comprising a web-based user interface, the web-based user interface including a first user interface element configured to enable selection of a second piece of content, a second engageable user interface element configured to adjust a budget for the second piece of content upwards or downwards responsive to user engagement therewith, and a third user interface element displaying a first forecasted value of a performance-based metric for the second piece of content;

receiving an adjusted budget for the second piece of content responsive to a detected engagement with the engageable second user interface element of the web-based user interface;

sending information about the second piece of content and sending the adjusted budget for the second piece of content to the first machine-learned model;

generating an updated forecasted value of the performance-based metric by the first machine-learned model for the second piece of content based at least in part on the adjusted budget for the second piece of content, the updated forecasted value comprising an incremental increase or decrease in the first forecasted value; and dynamically updating the third user interface element in the web-based user interface to display the generated updated forecasted value of the performance-based metric.

10. The system of claim 9, wherein the training includes training the first machine-learned model to forecast a value for the performance-based metric for a given piece of content with a given budget.

11. The system of claim 9, wherein the machine learning algorithm is a linear regression algorithm.

12. The system of claim 9, wherein the results include a first measure of the performance-based metric in the results produced by causing display of the first piece of content to users in the first subgroup and a second measure of the performance-based metric in the results produced by causing display of the first piece of content to users in the second subgroup.

13. The system of claim 12, wherein the performance-based metric is a number of clicks on the first piece of content.

14. The system of claim 12, wherein the first piece of content is a job posting and the performance-based metric is a number of applications received for a job corresponding to the job posting.

15. The system of claim 9, wherein the second engageable user interface element includes a slider that can slide in a first direction or a second direction, wherein sliding the slider in the first direction adjusts the budget downwards and wherein sliding the slider in the second direction adjusts the budget upwards.

16. A system comprising:

means for obtaining a first piece of content from a first content poster and a first budget for the first piece of content, the first budget indicative of a first value of promoting the first piece of content over a particular time period;

means for splitting the first budget asymmetrically into a high budget value and a low budget value, the high budget value being different and higher than the low budget value;

means for randomly assigning each user in a first group of users into a first subgroup or a second subgroup;

means for randomly assigning the high budget value to either the first subgroup or the second subgroup and assigning the low budget value to the subgroup to which the high budget value was not assigned;

means for causing the first piece of content to be displayed to users in the first subgroup based on the budget value assigned to the first subgroup;

means for causing the first piece of content to be displayed to users in the second subgroup based on the budget value assigned to the second subgroup;

means for designating results produced by the causing display of the first piece of content to the users in the first subgroup and the causing display of the first piece of content to the users in the second subgroup as training data;

means for training the first machine-learned model using a machine learning algorithm by feeding the training data into the machine learning algorithm;

means for generating a web page comprising a web-based user interface, the web-based user interface including a first user interface element configured to enable selection of a second piece of content, a second engageable user interface element configured to adjust a budget for the second piece of content upwards or downwards responsive to user engagement therewith, and a third user interface element displaying a first forecasted value of a performance-based metric for the second piece of content;

means for receiving an adjusted budget for the second piece of content responsive to a detected engagement with the engageable second user interface element of the web-based user interface;

means for sending information about the second piece of content and sending the adjusted budget for the second piece of content to the first machine-learned model;

means for generating an updated forecasted value of the performance-based metric by the first machine-learned model for the second piece of content based at least in part on the adjusted budget for the second piece of content, the updated forecasted value comprising an incremental increase or decrease in the first forecasted value; and means for dynamically updating the third user interface element in the web-based user interface to display the generated updated forecasted value of the performance-based metric.

\* \* \* \* \*